United States Patent
Park et al.

(10) Patent No.: US 10,779,219 B2
(45) Date of Patent: Sep. 15, 2020

(54) METHOD AND APPARATUS FOR TRANSMITTING DATA USING MULTI-CHANNELS IN WIRELESS COMMUNICATION SYSTEM

(71) Applicant: LG ELECTRONICS INC., Seoul (KR)

(72) Inventors: Hyunhee Park, Seoul (KR); Dongcheol Kim, Seoul (KR); Byungjoo Lee, Seoul (KR); Giwon Park, Seoul (KR)

(73) Assignee: LG Electronics Inc., Seoul (KR)

( * ) Notice: Subject to any disclaimer, the term of this patent is extended or adjusted under 35 U.S.C. 154(b) by 27 days.

(21) Appl. No.: 15/556,559

(22) PCT Filed: Mar. 9, 2016

(86) PCT No.: PCT/KR2016/002326
§ 371 (c)(1),
(2) Date: Sep. 7, 2017

(87) PCT Pub. No.: WO2016/144088
PCT Pub. Date: Sep. 15, 2016

(65) Prior Publication Data
US 2018/0041941 A1 Feb. 8, 2018

Related U.S. Application Data

(60) Provisional application No. 62/130,579, filed on Mar. 9, 2015.

(51) Int. Cl.
*H04W 40/34* (2009.01)
*H04W 84/18* (2009.01)
(Continued)

(52) U.S. Cl.
CPC ........... *H04W 40/34* (2013.01); *H04W 8/005* (2013.01); *H04W 84/18* (2013.01); *H04W 40/24* (2013.01); *H04W 88/02* (2013.01)

(58) Field of Classification Search
None
See application file for complete search history.

(56) References Cited

U.S. PATENT DOCUMENTS

2014/0254569 A1* 9/2014 Abraham .............. H04L 5/0092
370/336
2014/0313965 A1 10/2014 Basra et al.
(Continued)

FOREIGN PATENT DOCUMENTS

| WO | 2014109513 A1 | 7/2014 |
| WO | 2014120557 A1 | 8/2014 |
| WO | 2014185954 A1 | 11/2014 |

OTHER PUBLICATIONS

Hayoung Yoon, "Peer-assist video-on-demand in multi-channel switching WiFi- based mobile networks," Dec. 3, 2012, pp. 3-4.

*Primary Examiner* — Gregory B Sefcheck
*Assistant Examiner* — Suk Jin Kang
(74) *Attorney, Agent, or Firm* — Dentons US LLP

(57) ABSTRACT

One embodiment of the present specification may provide a method for transmitting data by a first NAN device in a wireless communication system. Here, the method for transmitting data by the first NAN device may comprise the steps of: exchanging a service discovery frame (SDF) with a second NAN device using a common channel; switching the first NAN device to a first channel during a first interval; checking whether the switched first channel is available during a second interval; and if the first channel is available, transmitting data to the second NAN device via the first channel. Here, information on the first interval and the second interval with respect to the first channel may be included in the service discovery frame.

4 Claims, 12 Drawing Sheets

(51) Int. Cl.
*H04W 8/00* (2009.01)
*H04W 40/24* (2009.01)
*H04W 88/02* (2009.01)

(56) References Cited

U.S. PATENT DOCUMENTS

| | | | |
|---|---|---|---|
| 2015/0156797 A1* | 6/2015 | Park | H04W 74/0808 370/329 |
| 2016/0014694 A1* | 1/2016 | Patil | H04W 52/0219 370/254 |
| 2016/0014714 A1* | 1/2016 | Patil | H04L 5/0055 455/458 |
| 2016/0014715 A1* | 1/2016 | Patil | H04W 52/0216 370/329 |
| 2016/0061933 A1* | 3/2016 | Chung | H04W 4/023 455/456.1 |
| 2016/0088611 A1* | 3/2016 | Abraham | H04W 48/16 370/329 |
| 2016/0119894 A1* | 4/2016 | Patil | H04W 8/005 455/515 |
| 2016/0127459 A1* | 5/2016 | Qi | H04L 67/104 370/312 |
| 2016/0128113 A1* | 5/2016 | Qi | H04W 8/005 370/329 |
| 2016/0150392 A1* | 5/2016 | Jung | H04W 8/005 455/450 |
| 2016/0150466 A1* | 5/2016 | Jung | H04W 8/005 455/434 |
| 2016/0150537 A1* | 5/2016 | Jung | H04W 48/16 455/452.1 |
| 2016/0157089 A1* | 6/2016 | Qi | H04W 76/27 370/254 |
| 2016/0157193 A1* | 6/2016 | Qi | H04W 56/00 370/350 |
| 2016/0165653 A1* | 6/2016 | Liu | H04L 67/104 370/329 |
| 2016/0183171 A1* | 6/2016 | Hareuveni | H04W 64/00 370/328 |
| 2016/0205529 A1* | 7/2016 | Oren | H04W 8/005 370/336 |
| 2016/0226928 A1* | 8/2016 | Park | H04L 65/1073 |
| 2016/0278112 A1* | 9/2016 | Liu | H04W 8/005 |
| 2016/0309315 A1* | 10/2016 | Shmukler | H04W 48/16 |
| 2016/0366578 A1* | 12/2016 | Abraham | H04W 8/005 |
| 2017/0111772 A1* | 4/2017 | Qi | H04L 67/104 |
| 2017/0311240 A1* | 10/2017 | Jung | H04W 8/005 |
| 2018/0176857 A1* | 6/2018 | Huang | H04W 48/16 |
| 2018/0338343 A1* | 11/2018 | Qi | H04W 76/27 |
| 2019/0014610 A1* | 1/2019 | Liu | H04L 67/104 |
| 2019/0037619 A1* | 1/2019 | Qi | H04W 12/003 |
| 2019/0053141 A1* | 2/2019 | Jung | H04W 8/005 |

* cited by examiner

METHOD AND APPARATUS FOR TRANSMITTING DATA USING MULTI-CHANNELS IN WIRELESS COMMUNICATION SYSTEM

This application is a National Stage Application of International Application No. PCT/KR2016/002326, filed on Mar. 9, 2016, which claims the benefit of U.S. Provisional Application No. 62/130,579, filed on Mar. 9, 2015, all of which are hereby incorporated by reference in their entirety for all purposes as if fully set forth herein.

TECHNICAL FIELD

The present invention relates to a wireless communication system, and more particularly, to a method of transmitting data using multiple channels in a wireless communication system and an apparatus therefor.

BACKGROUND ART

Wireless access systems have been widely deployed to provide various types of communication services such as voice or data. In general, a wireless access system is a multiple access system that may support communication of multiple users by sharing available system resources (e.g., a bandwidth, transmission power, etc.). For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a multi carrier frequency division multiple access (MC-FDMA) system.

Recently, various wireless communication technologies have been developed with the advancement of information communication technology. Among the wireless communication technologies, a wireless local area network (WLAN) is the technology capable of accessing the Internet by wireless in a home, a company or a specific service provided area through portable device such as a personal digital assistant (PDA), a laptop computer, a portable multimedia player (PMP), etc. based on a radio frequency technology.

DISCLOSURE OF THE INVENTION

Technical Tasks

A technical task of the present specification is to provide a method of transmitting data using multiple channels in a wireless communication system and an apparatus therefor.

Another technical task of the present specification is to provide a method of providing channel information to a NAN (neighbor awareness networking) device to make the NAN device use the channel information in transmitting data.

The other technical task of the present specification is to provide information for checking whether or not a NAN device uses a channel (busy/clear) to transmit data.

Technical Solution

To achieve these and other advantages and in accordance with the purpose of the present invention, as embodied and broadly described, according to one embodiment, a method of transmitting data, which is transmitted by a first NAN (neighbor awareness networking) device in a wireless communication system, includes the steps of exchanging a service discovery frame (SDF) with a second NAN device using a common channel, switching the first NAN device to a first channel during a first period, checking whether or not the switched first channel is available during a second period, and if the first channel is available, transmitting data to the second NAN device via the first channel. In this case, the service discovery frame can include information on the first period and the second period for the first channel To further achieve these and other advantages and in accordance with the purpose of the present invention, according to a different embodiment, a first NAN (neighbor awareness networking) device transmitting data in a wireless communication system includes a reception module configured to receive information form an external device, a transmission module configured to transmit information to an external device, and a processor configured to control the reception module and the transmission module, the processor configured to exchange a service discovery frame (SDF) with a second NAN device using a common channel, the processor configured to switch to a first channel during a first period, the processor configured to check whether or not the switched first channel is available during a second period, the processor, if the first channel is available, configured to transmit data to the second NAN device via the first channel. In this case, the service discovery frame can include information on the first period and the second period for the first channel.

Following items can be commonly applied to a method of transmitting data in a wireless communication system and a NAN device.

The service discovery frame can further include information on multiple channels to which the first NAN device is switchable. In this case, the first channel may correspond to one of the multiple channels.

The service discovery frame can include a data path attribute field. In this case, the information on the multiple channels and the information on the first period and the second period can be included in the data path attribute field.

If the first channel is available, data can be transmitted to the second NAN device when a third period elapses after the second period ends.

The NAN data path attribute field can include at least one selected from the group consisting of a multichannel switch mode field, a multichannel switch count field, an operating class field, a current channel number field, a number of channels field, a new multichannel number field, a multichannel offset field, a multichannel randomization interval field, and a short clear check interval field.

Information on the first period is indicated by the multichannel switch count field, information on the second period is indicated by the multichannel randomization interval field, and information on the third period can be indicated by the short clear check interval field.

The service discovery frame can be exchanged within a discovery window (DW).

If the first NAN device fails to switch to the first channel during the first period, the first NAN device does not transmit data to the second NAN device via the first channel and can exchange a new service discovery frame with the second NAN device in a next discovery window.

If the first channel is unavailable, the first NAN device does not transmit data to the second NAN device via the first channel and can exchange a new service discovery frame with the second NAN device in a next discovery window.

Advantageous Effects

According to the present specification, it is able to provide a method of transmitting data using multiple channels in a wireless communication system and an apparatus therefor.

According to the present specification, it is able to provide a method of providing channel information to a NAN (neighbor awareness networking) device to make the NAN device use the channel information in transmitting data.

According to the present specification, it is able to provide information for checking whether or not a NAN device uses a channel (busy/clear) to transmit data.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

FIG. 8 is a diagram illustrating a discovery window and the like;

BEST MODE

Mode for Invention

Figure 1:
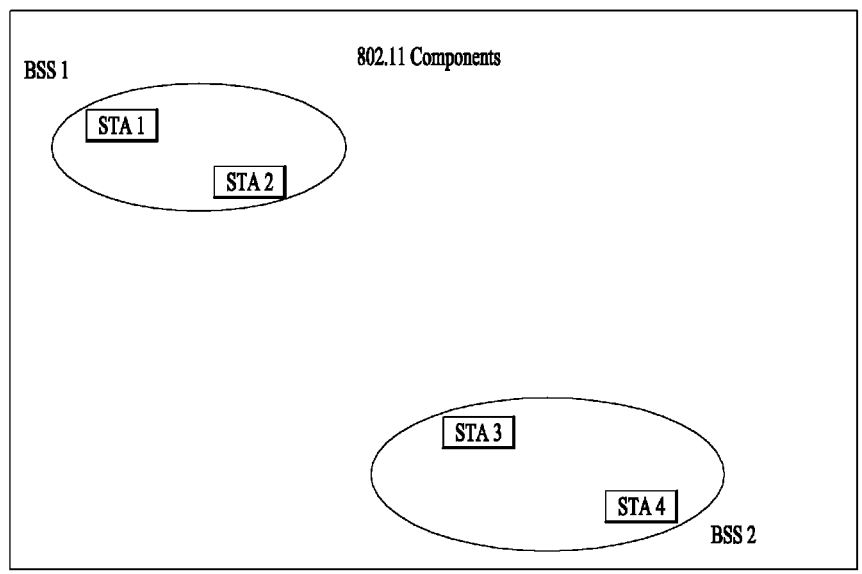
FIG. 1 is a diagram illustrating an exemplary structure of IEEE 802.11 system.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide the full understanding of the present invention. However, it will be apparent to those skilled in the art that the present invention may be implemented without such specific details.

The following embodiments can be achieved by combinations of structural elements and features of the present invention in prescribed forms. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

Specific terminologies in the following description are provided to help the understanding of the present invention. And, these specific terminologies may be changed to other formats within the technical scope or spirit of the present invention.

Occasionally, to avoid obscuring the concept of the present invention, structures and/or devices known to the public may be skipped or represented as block diagrams centering on the core functions of the structures and/or devices. In addition, the same reference numbers will be used throughout the drawings to refer to the same or like parts in this specification.

The embodiments of the present invention can be supported by the disclosed standard documents disclosed for at least one of wireless access systems including IEEE 802 system, 3GPP system, 3GPP LTE system, LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document can be supported by the above standard documents.

The following embodiments of the present invention can be applied to a variety of wireless access technologies, for example, CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc.

Although the terms such as "first" and/or "second" in this specification may be used to describe various elements, it is to be understood that the elements are not limited by such terms. The terms may be used to identify one element from another element. For example, a first element may be referred to as a second element, and vice versa within the range that does not depart from the scope of the present invention.

In the specification, when a part "comprises" or "includes" an element, it means that the part further comprises or includes another element unless otherwise mentioned. Also, the terms ". . . unit", ". . . module" disclosed in the specification means a unit for processing at least one function or operation, and may be implemented by hardware, software or combination of hardware and software.

For clarity, the following description focuses on IEEE 802.11 systems. However, technical features of the present invention are not limited thereto.

Structure of WLAN System

FIG. 1 is a diagram illustrating an exemplary structure of IEEE 802.11 system to which the present invention is applicable.

IEEE 802.11 structure may include a plurality of components and WLAN supportive of transparent STA mobility for an upper layer can be provided by interactions between the components. A basic service set (BSS) may correspond to a basic component block in IEEE 802.11 WLAN. FIG. 1 shows one example that two basic service sets BSS 1 and BSS 2 exist and that 2 STAs are included as members of each BSS. In particular, STA 1 and STA 2 are included in the BSS 1 and STA 3 and STA 4 are included in the BSS 2. In FIG. 1, an oval indicating the BSS can be understood as indicating a coverage area in which the STAs included in the corresponding BSS maintain communication. This area may be called a basic service area (BSA). Once the STA moves out of the BSA, it is unable to directly communicate with other STAs within the corresponding BSA.

A most basic type of BSS in IEEE 802.11 WLAN is an independent BSS (IBSS). For instance, IBSS can have a minimum configuration including 2 STAs only. Moreover, the BSS (e.g., BSS 1 or BSS 2) shown in FIG. 1, which has the simplest configuration and in which other components are omitted, may correspond to a representative example of the IBSS. Such a configuration is possible if STAs can directly communicate with each other. Moreover, the above-mentioned WLAN is not configured according to a devised plan but can be configured under the necessity of WLAN. And, this may be called an ad-hoc network.

If an STA is turned on/off or enters/escapes from a BSS area, membership of the STA in a BSS can be dynamically changed. In order to obtain the membership of the BSS, the STA can join the BSS using a synchronization procedure. In order to access all services of the BSS based structure, the STA should be associated with the BSS. This association may be dynamically configured or may include a use of a DSS (distribution system service).

Additionally, FIG. 1 shows components such as a DS (distribution system), a DSM (distribution system medium), an AP (access point) and the like.

In WLAN, a direct station-to-station distance can be restricted by PHY capability. In some cases, the restriction of the distance may be sufficient enough. However, in some cases, communication between stations located far away from each other may be necessary. In order to support extended coverage, the DS (distribution system) may be configured.

The DS means a structure in which BSSs are interconnected with each other. Specifically, the BSS may exist as an extended type of component of a network consisting of a plurality of BSSs instead of an independently existing entity as shown in FIG. 1.

The DS corresponds to a logical concept and can be specified by a characteristic of the DSM. Regarding this, IEEE 802.11 standard logically distinguishes a wireless medium (WM) from the DSM. Each of the logical media is used for a different purpose and is used as a different component. According to the definition of the IEEE 802.11 standard, the media are not limited to be identical to each other or to be different from each other. Since a plurality of the media are logically different from each other, flexibility of IEEE 802.11 WLAN structure (a DS structure or a different network structure) can be explained. In particular, the IEEE 802.11 WLAN structure can be implemented in various ways and the WLAN structure can be independently specified by a physical characteristic of each implementation case.

The DS can support a mobile device in a manner of providing seamless integration of a plurality of BSSs and logical services necessary for handling an address to a destination.

The AP enables associated STAs to access the DS through the WM and corresponds to an entity having STA functionality. Data can be transferred between the BSS and the DS through the AP. For instance, as shown in FIG. 1, while each of the STA 2 and STA 3 have STA functionality, the STA 2 and STA 3 provide functions of enabling associated STAs (STA 1 and STA 4) to access the DS. And, since all APs basically correspond to an STA, all APs correspond to an addressable entity. An address used by the AP for communication in the WM should not be identical to an address used by the AP for communication in the DSM.

Data transmitted from one of STAs associated with an AP to an STA address of the AP is always received in an uncontrolled port and the data can be processed by an IEEE 802.1X port access entity. Moreover, if a controlled port is authenticated, transmission data (or frame) can be delivered to a DS.

Layer Structure

Operations of the STA which operates in a wireless LAN system can be explained in terms of the layer structure. In terms of a device configuration, the layer structure can be implemented by a processor. The STA may have a structure of a plurality of layers. For example, a main layer structure handled in the 802.11 standard document includes a MAC sublayer and a physical (PHY) layer on a data link layer (DLL). The PHY layer may include a physical layer convergence procedure (PLCP) entity, a physical medium dependent (PMD) entity, etc. The MAC sublayer and the PHY layer conceptually include management entities called MAC sublayer management entity (MLME) and physical layer management entity (PLME), respectively. These entities provide a layer management service interface for performing a layer management function.

A station management entity (SME) is present within each STA in order to provide an accurate MAC operation. The SME is a layer-independent entity that may be considered as existing in a separate management plane or as being off to the side. Detailed functions of the SME are not specified in this document but it may be generally considered as being responsible for functions of gathering layer-dependent status from the various layer management entities (LMEs), setting values of layer-specific parameters similar to each other. The SME may perform such functions on behalf of general system management entities and may implement a standard management protocol.

The aforementioned entities interact with each other in various ways. For example, the entities may interact with each other by exchanging GET/SET primitives. The primitive means a set of elements or parameters related to a specific purpose. XX-GET.request primitive is used for requesting a value of a given MIB attribute (management information based attribute). XX-GET.confirm primitive is used for returning an appropriate MIB attribute value if a status is 'success', otherwise it is used for returning an error indication in a status field. XX-SET.request primitive is used to request that an indicated MIB attribute be set to a given value. If this MIB attribute implies a specific action, this requests that the action be performed. And, XX-SET.confirm primitive is used such that, if the status is 'success', this confirms that the indicated MIB attribute has been set to the requested value, otherwise it is used to return an error condition in the status field. If this MIB attribute implies a specific action, this confirms that the action has been performed.

Moreover, the MLME and the SME may exchange various MLME_GET/SET primitives through an MLME SAP (service access point). Furthermore, various PLME_GET/

SET primitives may be exchanged between the PLME and the SME through PLME_SAP and may be exchanged between the MLME and the PLME through an MLME-PLME_SAP.

NAN (Neighbor Awareness Network) Topology

Figure 2:
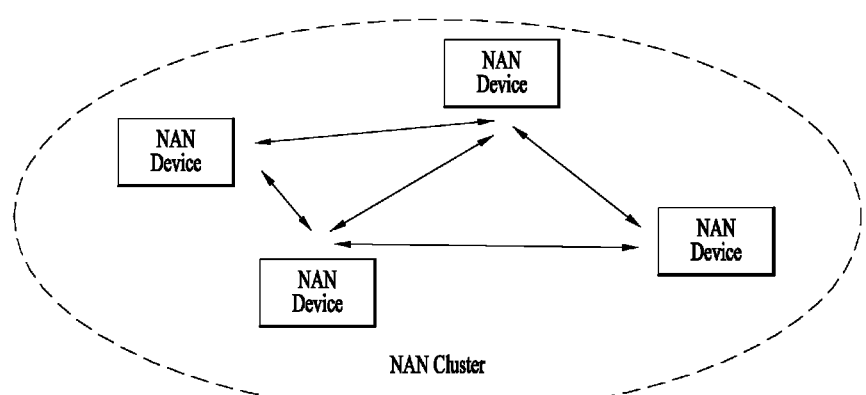
FIGS. 2 and 3 are diagrams illustrating examples of a NAN cluster.
Figure 3:
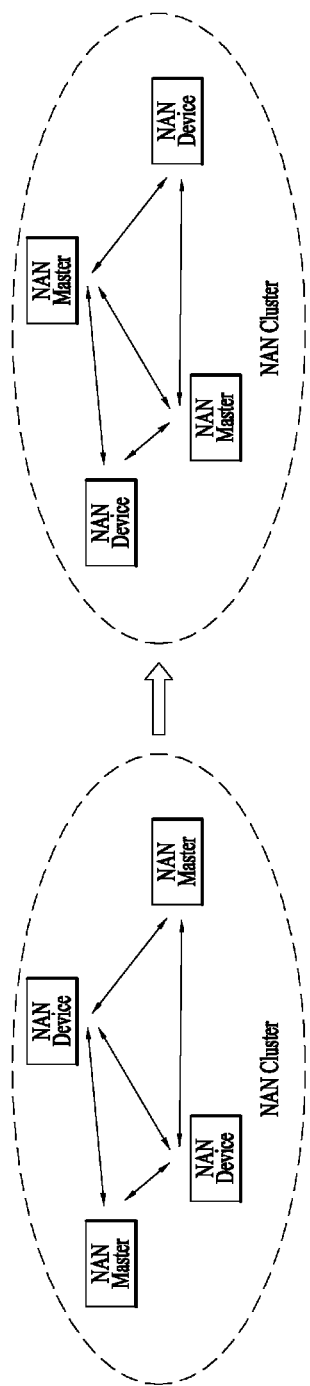

A NAN network can be constructed with NAN devices (devices) that use a set of identical NAN parameters (e.g., a time interval between consecutive discovery windows, an interval of a discovery window, a beacon interval, a NAN channel, etc.). A NAN cluster can be formed by NAN devices and the NAN cluster means a set of NAN devices that are synchronized on the same discovery window schedule. And, a set of the same NAN parameters is used in the NAN cluster. FIG. 2 illustrates an example of the NAN cluster. A NAN device included in the NAN cluster may directly transmit a multicast/unicast service discovery frame to a different NAN device within a range of the discovery window. As shown in FIG. 3, at least one NAN master may exist in a NAN cluster and the NAN master may be changed. Moreover, the NAN master may transmit all of a synchronization beacon frame, discovery beacon frame and service discovery frame.

NAN Device Architecture

Figure 4:
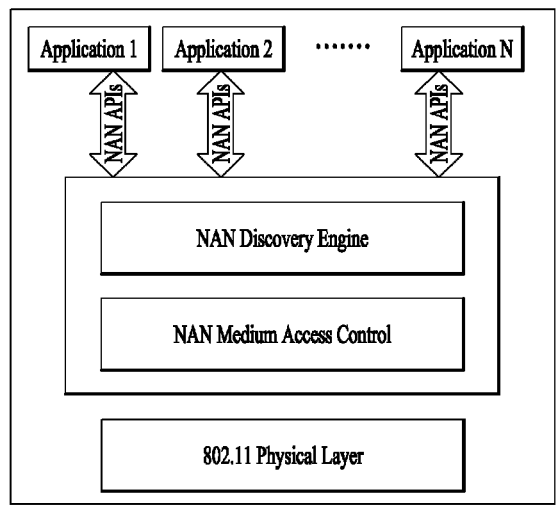
FIG. 4 illustrates an example of a structure of a NAN device.

FIG. 4 illustrates an example of a structure of a NAN device (device). Referring to FIG. 4, the NAN device is based on a physical layer in 802.11 and its main components correspond to a NAN discovery engine, a NAN MAC (medium access control), and NAN APIs connected to respective applications (e.g., Application 1, Application 2, . . . , Application N).

Figure 5:
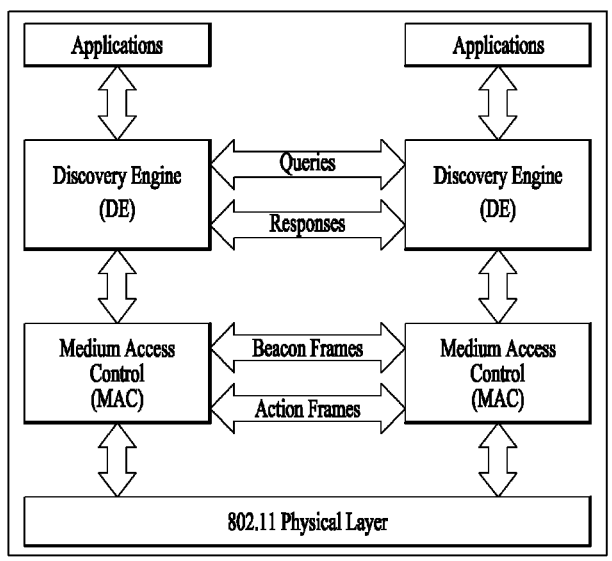
FIGS. 5 and 6 illustrate relations between NAN components.
Figure 6:
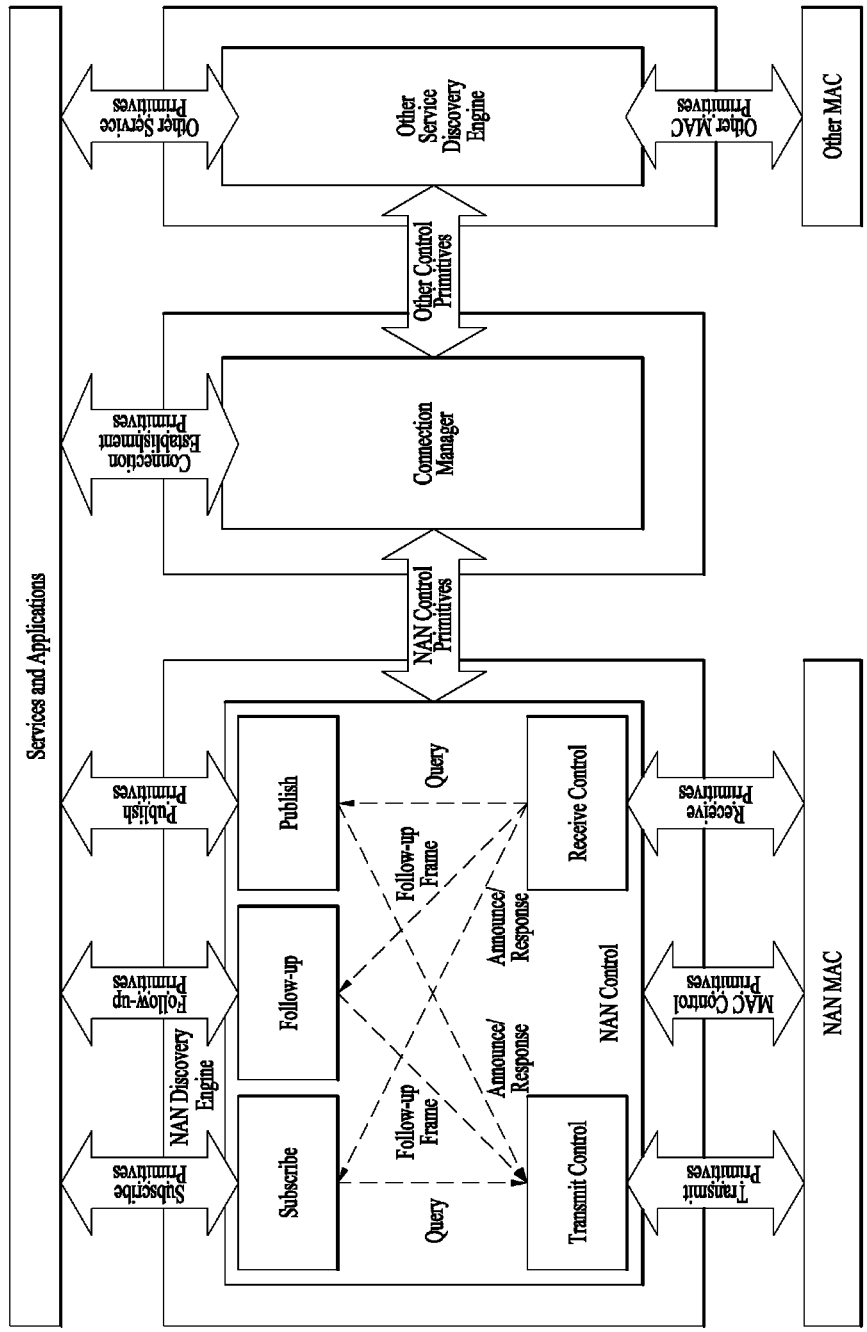

FIGS. 5 and 6 illustrate relations between NAN components. Service requests and responses are processed through the NAN discovery engine, and the NAN beacon frames and the service discovery frames are processed by the NAN MAC. The NAN discovery engine may provide functions of subscribing, publishing, and following-up. The publish/subscribe functions are operated by services/applications through a service interface. If the publish/subscribe commands are executed, instances for the publish/subscribe functions are generated. Each of the instances is driven independently and a plurality of instances can be driven simultaneously in accordance with the implementation. The follow-up function corresponds to means for the services/applications that transceive specific service information.

Role and State of NAN Device

Figure 7:
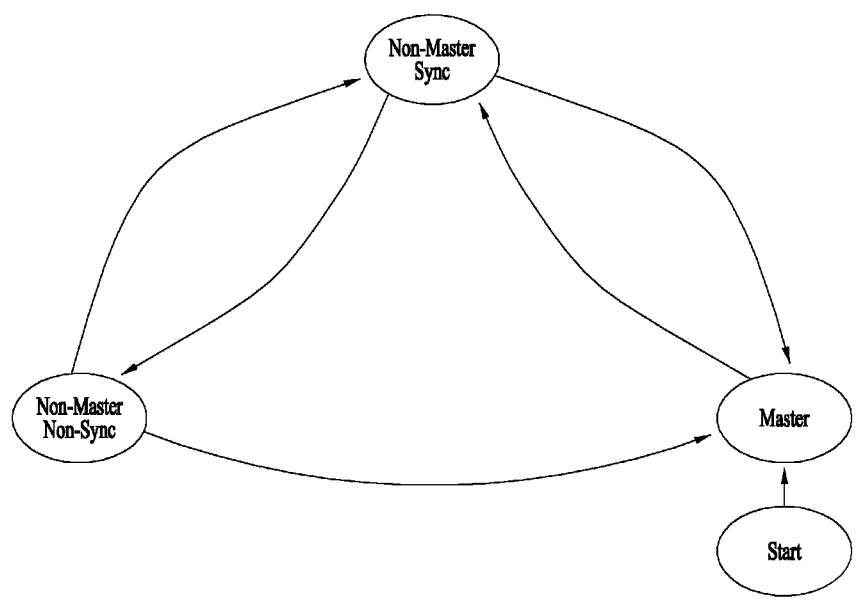
FIG. 7 is a diagram illustrating a state transition of a NAN device.

As mentioned in the foregoing description, a NAN device (device) can serve as a NAN master and the NAN master can be changed. In other words, roles and states of the NAN device can be shifted in various ways and related examples are illustrated in FIG. 7. The roles and states, which the NAN device can have, may include a master (hereinafter, the master means a state of master role and sync), a Non-master sync, and a Non-master Non-sync. Transmission availability of the discovery beacon frame and/or the synchronization beacon frame can be determined according to each of the roles and states and it may be set as illustrated in Table 1.

TABLE 1

| Role and State | Discovery Beacon | Synchronization Beacon |
| --- | --- | --- |
| Master | Transmission Possible | Transmission Possible |
| Non-Master Sync | Transmission Impossible | Transmission Possible |
| Non-Master Non-Sync | Transmission Impossible | Transmission Impossible |

The state of the NAN device can be determined according to a master rank (MR). The master rank indicates the preference of the NAN device to serve as the NAN master. In particular, a high master rank means strong preference for the NAN master. The NAN MR can be determined by Master Preference, Random Factor, Device MAC address, and the like according to Formula 1.

$$\text{MasterRank} = \text{MasterPreference} * 2^{56} + \text{RandomFactor} * 2^{48} - \text{MAC}[5] * 2^{'} + \ldots + \text{MAC}[0] \quad \text{[Formula 1]}$$

In Formula 1, the Master Preference, Random Factor, Device MAC address may be indicated through a master indication attribute. The master indication attributes may be set as illustrated in Table 2.

TABLE 2

| Field Name | Size (Octets) | Value | Description |
| --- | --- | --- | --- |
| Attribute ID | 1 | 0x00 | Identifies the type of NAN attribute. |
| Length | 2 | 2 | Length of the following field in the attribute |
| Master Preference | 1 | 0-255 | Information that is used to indicate a NAN Device's preference to serve as the role of Master, with a larger value indicating a higher preference. |
| Random Factor | 1 | 0-255 | A random number selected by the sending NAN Device. |

Regarding the above MR, in case of a NAN device that activates a NAN service and initiates a NAN cluster, each of the Master Preference and the Random Factor is set to 0 and NANWarmUp is reset. The NAN device should set a Master Preference field value in the master indication attribute to a value greater than 0 and a Random Factor value in the master indication attribute to a new value until when the NANWarmUp expires. When a NAN device joins a NAN cluster in which the Master Preference of an anchor master is set to a value greater than 0, the corresponding NAN device may set the Master Preference to a value greater than 0 and the Random Factor to a new value irrespective of expiration of the NANWarmUp.

Moreover, a NAN device can become an anchor master of a NAN cluster depending on an MR value. That is, all NAN devices have capabilities of operating as the anchor master. The anchor master means the device that has a highest MR and a smallest AMBTT (anchor master beacon transmit time) value and has a hop count (HC) (to the anchor master) set to 0 in the NAN cluster. In the NAN cluster, two anchor masters may exist temporarily but a single anchor master is a principle of the NAN cluster. If a NAN device becomes an anchor master of a currently existing NAN cluster, the NAN device adopts TSF used in the currently existing NAN cluster without any change.

The NAN device can become the anchor master in the following cases: if a new NAN cluster is initiated; if the master rank is changed (e.g., if an MR value of a different NAN device is changed or if an MR value of the anchor master is changed); or if a beacon frame of the current anchor master is not received any more. In addition, if the MR value of the different NAN device is changed or if the MR value of the anchor master is changed, the NAN device may lose the status of the anchor master. The anchor master can be determined according to an anchor master selection algorithm in the following description. In particular, the anchor master selection algorithm is the algorithm for determining which NAN device becomes the anchor master of the NAN cluster. And, when each NAN device joins the NAN cluster, the anchor master selection algorithm is driven.

If a NAN device initiates a new NAN cluster, the NAN device becomes the anchor master of the new NAN cluster. If a NAN synchronization beacon frame has a hop count in excess of a threshold, the NAN synchronization beacon frame is not used by NAN devices. And, other NAN synchronization beacon frames except the above-mentioned NAN synchronization beacon frame are used to determine the anchor master of the new NAN cluster.

If receiving the NAN synchronization beacon frame having the hop count equal to or less than the threshold, the NAN device compares an anchor master rank value in the beacon frame with a stored anchor master rank value. If the stored anchor master rank value is greater than the anchor master value in the beacon frame, the NAN device discards the anchor master value in the beacon frame. If the stored anchor master value is less than the anchor master value in the beacon frame, the NAN device newly stores values greater by 1 than the anchor master rank and the hop count included in the beacon frame and an AMBTT value in the beacon frame. If the stored anchor master rank value is equal to the anchor master value in the beacon frame, the NAN device compares hop counters. Then, if a hop count value in the beacon frame is greater than a stored value, the NAN device discards the received beacon frame. If the hop count value in the beacon frame is equal to (the stored value −1) and if an AMBTT value is greater than the stored value, the NAN device newly stores the AMBTT value in the beacon frame. If the hop count value in the beacon frame is less than (the stored value −1), the NAN device increases the hop count value in the beacon frame by 1. The stored AMBTT value is updated according to the following rules. If the received beacon frame is transmitted by the anchor master, the AMBTT value is set to the lowest four octets of time stamp included in the received beacon frame. If the received beacon frame is transmitted from a NAN master or non-master sync device, the AMBTT value is set to a value included in a NAN cluster attribute in the received beacon frame.

Meanwhile, a TSF timer of a NAN device exceeds the stored AMBTT value by more than 16*512 TUs (e.g., 16 DW periods), the NAN device may assume itself as an anchor master and then update an anchor master record. In addition, if any of MR related components (e.g., Master Preference, Random Factor, MAC Address, etc.) is changed, a NAN device not corresponding to the anchor master compares the changed MR with a stored value. If the changed MR of the NAN device is greater than the stored value, the corresponding NAN device may assume itself as the anchor master and then update the anchor master record.

Moreover, a NAN device may set anchor master fields of the cluster attributes in the NAN synchronization and discovery beacon frames to values in the anchor master record, except that the anchor master sets the AMBTT value to a TSF value of corresponding beacon transmission. The NAN device, which transmits the NAN synchronization beacon frame or the discovery beacon frame, may be confirmed that the TSF in the beacon frame is derived from the same anchor master included in the cluster attribute.

Moreover, a NAN device may adopt a TSF timer value in a NAN beacon received with the same cluster ID in the following case: i) if the NAN beacon indicates an anchor master rank higher than a value in an anchor master record of the NAN device; or ii) if the NAN beacon indicates an anchor master rank equal to the value in the anchor master record of the NAN device and if a hop count value and an AMBTT value in the NAN beacon frame are larger values in the anchor master record.

NAN Synchronization

NAN devices (devices) participating in the same NAN Cluster may be synchronized with respect to a common clock. A TSF in the NAN cluster can be implemented through a distributed algorithm that should be performed by all the NAN devices. Each of the NAN devices participating in the NAN cluster may transmit NAN synchronization beacon frame (NAN sync beacon frame) according to the above-described algorithm. The NAN device may synchronize its clock during a discovery window (DW). A length of the DW corresponds to 16 TUs. During the DW, one or more NAN devices may transmit synchronization beacon frames in order to help all NAN devices in the NAN cluster synchronize their own clocks.

NAN beacon transmission is distributed. A NAN beacon frame is transmitted during a DW period existing at every 512 TU. All NAN devices can participate in generation and transmission of the NAN beacon according to their roles and states. Each of the NAN devices should maintain its own TSF timer used for NAN beacon period timing. A NAN synchronization beacon interval can be established by the NAN device that generates the NAN cluster. A series of TBTTs are defined so that the DW periods in which synchronization beacon frames can be transmitted are assigned exactly 512 TUs apart. Time zero is defined as a first TBTT and the discovery window starts at each TBTT.

Figure 8:
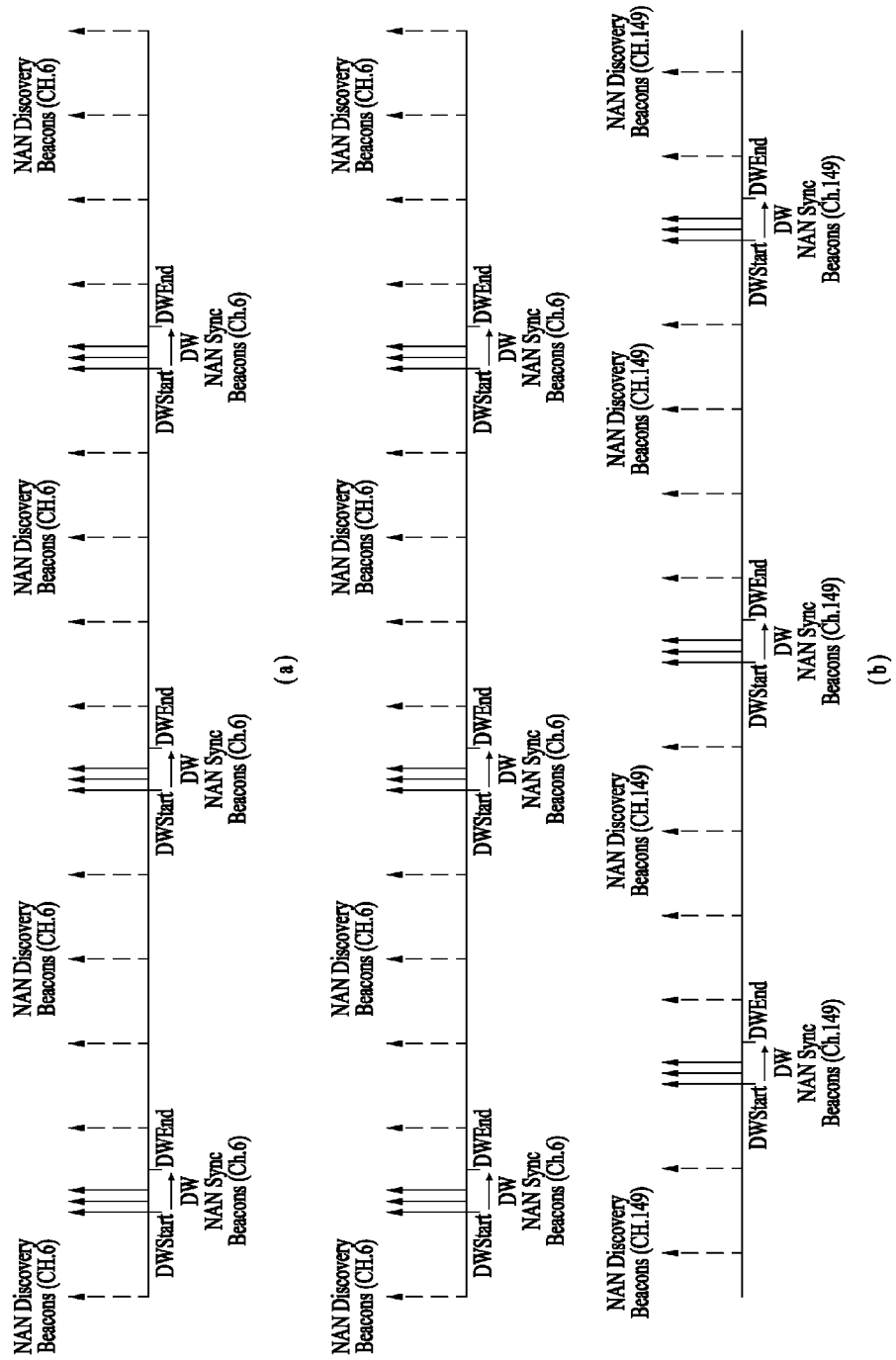

Each NAN device serving as a NAN master transmits a NAN discovery beacon frame from out of a NAN discovery window. On average, the NAN device serving as the NAN master transmits the NAN discovery beacon frame every 100 TUs. A time interval between consecutive NAN discovery beacon frames is smaller than 200 TUs. If a scheduled transmission time overlaps with a NAN discovery window of the NAN cluster in which the corresponding NAN device participates, the NAN device serving as the NAN master is able to omit transmission of the NAN discovery beacon frame. In order to minimize power required to transmit the NAN discovery beacon frame, the NAN device serving as the NAN master may use AC_VO (WMM Access Category—Voice) contention setting. FIG. 8 illustrates relations between a discovery window and a NAN discovery beacon frame and transmission of NAN synchronization/discovery beacon frames. Particularly, FIG. 8(a) shows transmission of NAN discovery and synchronization beacon frames of a NAN device operating in 2.4 GHz band. FIG. 8(b) shows transmission of NAN discovery and synchronization beacon frames of a NAN device operating in 2.4 GHz and 5 GHz bands.

Figure 9:
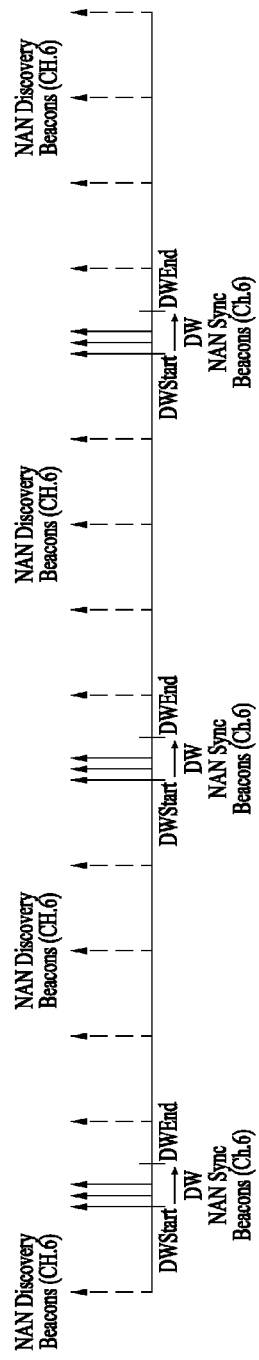
FIG. 9 is a diagram illustrating a discovery window.

FIG. 9 is a diagram illustrating a discovery window. As mentioned in the foregoing description, each NAN device performing a master role transmits a synchronization beacon frame within a discovery window and transmits a discovery beacon frame at the outside of the discovery window. In this case, as mentioned in the foregoing description, the discovery window can be repeated in every 512 TU. In this case, duration of the discovery window may correspond to 16

TUs. In particular, the discovery window can last during 16 TUs. In this case, for example, all NAN devices belonging to a NAN cluster may awake at every discovery window to receive a synchronization beacon frame from a master NAN device. By doing so, the NAN cluster can be maintained. In this case, if all NAN devices awake at every discovery window in a fixed manner, power consumption of the devices may get worse. Hence, it is necessary to have a method of reducing power consumption by dynamically controlling duration of a discovery window while synchronization is maintained in a NAN cluster.

For example, as mentioned in the foregoing description, a NAN device may operate in 2.4 GHz band or 5 GHz band. As a different example, a NAN device may operate in sub 1 GHz band. For example, a NAN device can be configured to support IEEE 802.11ah that supports sub 1 GHz band. For example, if a NAN device supports 900 MHz, it may have link quality and a physical model different from link quality and a physical model in 2.4 GHz or 5 GHz.

For example, if a NAN device supports 900 MHz, the NAN device can send a signal farther and perform communication in a wider range. In this case, data communication can be performed between NAN devices and data can be exchanged between NAN devices. In this case, since the data exchange is performed based on the data communication, a problem may exist in efficiently managing power in the NAN device. In order to solve the problem, it may differently configure a method of configuring a discovery window period. FIG. 9 shows a basic structure that a synchronization beacon frame is transmitted within a discovery window and a discovery beacon frame is transmitted at the outside of the discovery window. The basic structure can also be similarly applied to a NAN device supporting 900 MHz band.

Figure 10:
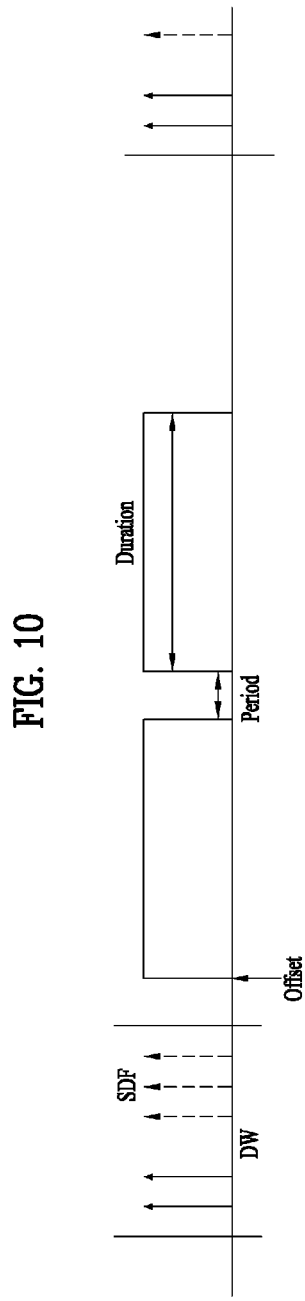
FIG. 10 is a diagram for a method of performing data exchange based on a NAN data path.

FIG. 10 is a diagram for a method of performing data exchange based on a NAN data path.

For example, as mentioned in the foregoing description, a NAN device can transmit a service discovery frame in a discovery window. In this case, the NAN device can discover a different NAN device capable of supporting a specific service via the service discovery frame. In this case, a frame format of the service discovery frame is shown in Table 3 in the following.

TABLE 3

| Field | Size (Octets) | Value (Hex) | Description |
|---|---|---|---|
| Category | 1 | 0x04 | IEEE 802.11 Public Action Frame |
| Action Field | 1 | 0x09 | IEEE 802.11 Public Action Frame Vendor Specific |
| OUI | 3 | 0x50-6F-9A | Wi-Fi Alliance specific OUI |
| OUI Type | 1 | 0x13 | Identifying the type and version of the NAN |
| NAN Attributes | Variable | Variable | One or more NAN Attributes |

Referring to Table 3, the service discovery frame can include a filed for a NAN attribute and the NAN attribute field includes different information according to a service discovery situation. The NAN device transmits the service discovery frame including information on discovery within a discovery window period to discover a NAN device supporting a specific service.

A legacy NAN device performs a service discovery only and does not perform data exchange. In this case, as a service is provided between NAN devices, data exchange for the service is required and it is necessary to define the data exchange. In this case, it may be able to additionally define a NAN data link (NDL) as a period for transmitting data for the service between NAN devices. The NAN devices can exchange data with each other in data path or data duration in the NAN data link.

More specifically, the NAN device can discover NAN devices supporting a specific service using the service discovery frame. The NAN device discovers a NAN device supporting a specific service via the service discovery frame and may be then able to exchange data for the specific service with the discovered NAN device. In this case, for example, the data exchanged between the NAN devices may correspond to data identified according to a service or a service application. In particular, the NAN device discovers a NAN device according to a service and may be able to perform data transmission according to the service.

In this case, referring to FIG. 10, when the NAN device exchanges data for a specific service with a discovered NAN device, a first NAN device can transmit a service discovery frame to a second NAN device in a discovery window. In this case, for example, the service discovery frame may correspond to a mandatorily exchanged frame. Subsequently, the first NAN device can transmit data by initiating a data path or a data duration at a timing point away from a timing point at which the discovery window ends as much as an offset value. In this case, for example, a period, which is not the discovery window, may correspond to the aforementioned NAN data link. In particular, data path or data duration for transmitting data can be configured from among the NAN data link.

In this case, for example, the service discovery frame can include at least one selected from the group consisting of information on a data path or a data duration for which data is transmitted, offset information, and period information of the data duration. In particular, the service discovery frame can include information necessary for transmitting data.

Consequently, two NAN devices perform service discovery via the service discovery frame and can perform data exchange in a data path.

Figure 11:
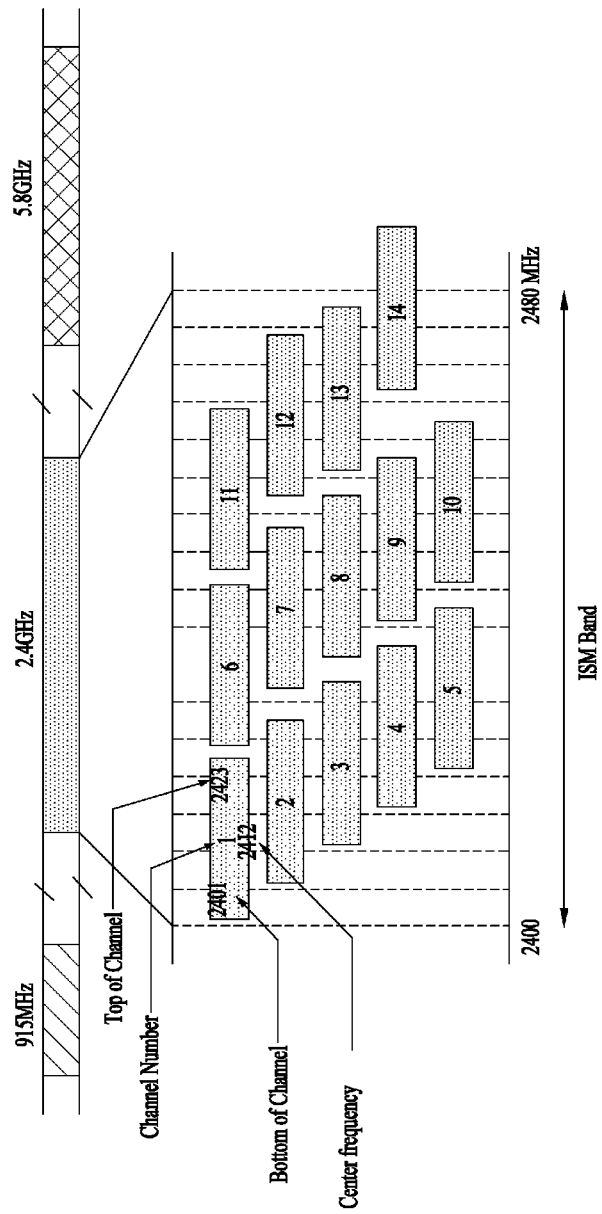
FIG. 11 is a diagram for multiple channels capable of being used by NAN devices.

FIG. 11 is a diagram for multiple channels capable of being used by NAN devices.

As mentioned in the foregoing description, it may be able to define a NAN data link as a period for transmitting data for a service exchanged between NAN devices. In this case, the NAN devices can exchange the data with each other in a data path or a data duration of the NAN data link. In this case, for example, when the NAN devices transmit the data using the data path, the NAN devices may use multiple channels defined by a frequency band. In particular, the NAN devices determine a channel used in the data path and may be able to transmit data via the determined channel. In this case, it is necessary for the NAN devices to obtain and check information for a multichannel operation. In the following, a method for the NAN devices to obtain the information for the multichannel operation is explained.

For example, the NAN devices may use multiple channels except a common channel via further availability. Table 4 in the following shows an example of using other multiple channels via a further availability map. Referring to Table 4, the NAN devices may stay in an awake state during a period ranging from b+16 TUs to b+64 TUs on a common channel (channel 6). In this case, b may correspond to a start point of a discovery window. In particular, the NAN devices can be awake in a period having a value of "1" in the further availability map.

And, for example, the NAN devices can be awake during a period ranging from b+128 TUs to b+160 TUs on a channel 149. And, for example, the NAN devices may stay in an awake state during a period ranging from b+256 TUs to b+352 TUs in a WLAN infrastructure via a channel x. And, for example, the NAN devices may stay in an awake state during a period ranging from b+384 TUs to b+480 TUs in a P2P via a channel y.

When the NAN devices are in an awake state, the NAN devices can perform an additional service discovery or a discovery operation. The NAN devices are able to use multiple channels rather than a common channel using the further availability map shown in Table 4. The further availability map can also be used for a service discovery or a discovery operation.

For example, since 2.4 GHz frequency band shown in FIG. 11 corresponds to a frequency band mainly used in Wi-Fi network, the 2.4 GHz frequency band can be used not only by a NAN service but also by a different service. Hence, it is necessary to check whether or not the channel is used. In particular, the NAN devices may use multiple channels as multiple channels for transmitting data only when the multiple channels are not used by a different service.

Figure 12:
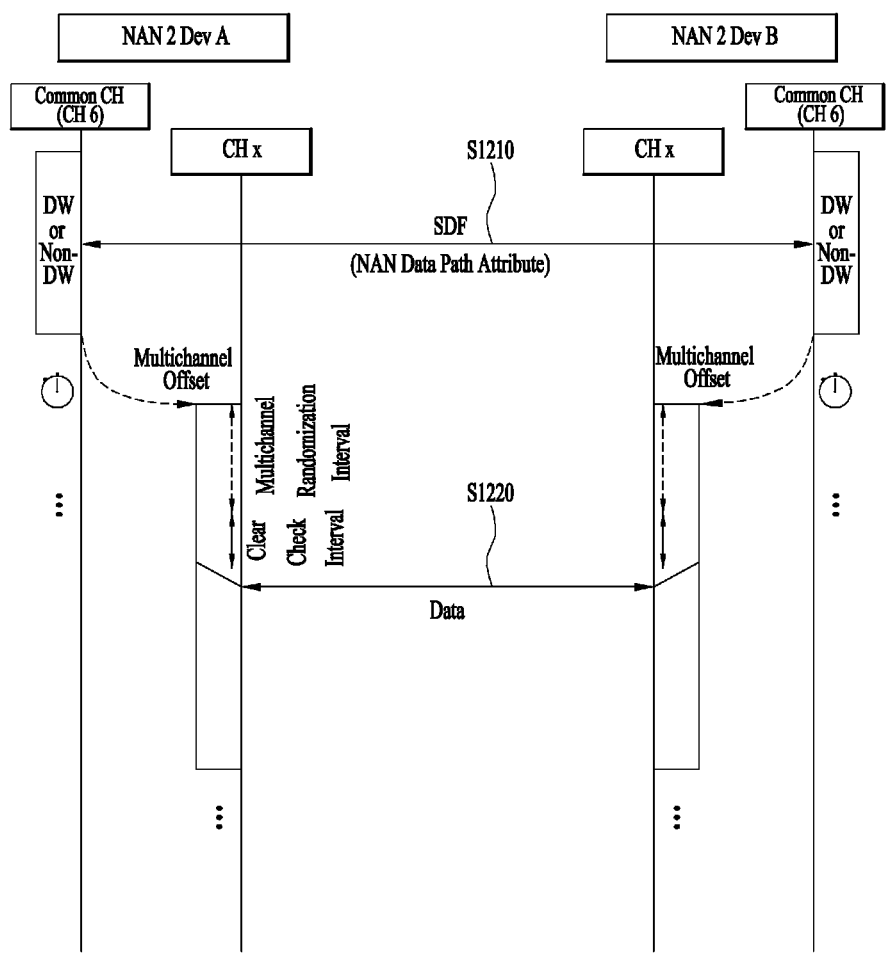
FIG. 12 is a flowchart of a method for NAN devices to exchange data based on multiple channels.

FIG. 12 is a flowchart of a method for NAN devices to exchange data based on multiple channels.

NAN devices can exchange a service discovery frame including multichannel information in a discovery window period to share the multichannel information capable of being used by the NAN devices [S1210]. And, for example, the NAN devices can transmit the service discovery frame including the multichannel information at the outside of the discovery window period using a further NAN service

TABLE 4

| | Operating Class/ Channel Number | Availability Interval Duration | Availability Intervals Bitmap |||||||||||||||| 
|---|---|---|---|---|---|---|---|---|---|---|---|---|---|---|---|---|---|
| | | | 0 | 1 | 2 | 3 | 4 | 5 | 6 | 7 | 8 | 9 | 10 | 11 | 12 | 13 | 14 | 15 |
| Further Availability Map Attribute | Channel 6 | 16 Us | 1 | 1 | 1 | 1 | 0 | 0 | 0 | 0 | 0 | 0 | 0 | 0 | 0 | 0 | 0 | 0 |
| | Channel 149 | 16 Us | 0 | 0 | 0 | 0 | 0 | 0 | 0 | 0 | 1 | 1 | 1 | 1 | 0 | 0 | 0 | 0 |
| | Channel x | 16 Us | 0 | 0 | 0 | 0 | 0 | 0 | 0 | 0 | 0 | 0 | 0 | 0 | 0 | 0 | 0 | 0 |
| | Channel y | 16 Us | 0 | 0 | 0 | 0 | 0 | 0 | 0 | 0 | 0 | 0 | 0 | 0 | 0 | 0 | 0 | 0 |
| WLAN nfrastrucure Attribute | — | 32 Us | 0 | | 0 | | 0 | | 0 | | 0 | | 0 | | 0 | | 0 | |
| P2P Operation Attribute | — | 32 Us | 0 | | 0 | | 0 | | 0 | | 0 | | 0 | | 0 | | 0 | |
| Further NAN Service Discovery Attribute | — | 64 Us | 1 | | | | 0 | | | | 1 | | | | 0 | | | |

| | Operating Class/ Channel Number | Availability Interval Duration | Availability Intervals Bitmap |||||||||||||||| 
|---|---|---|---|---|---|---|---|---|---|---|---|---|---|---|---|---|---|
| | | | 16 | 17 | 18 | 19 | 20 | 21 | 22 | 23 | 24 | 25 | 26 | 27 | 28 | 29 | 30 | 31 |
| Further Availability Map Attribute | Channel 6 | 16 Us | 0 | 0 | 0 | 0 | 0 | 0 | 0 | 0 | 0 | 0 | 0 | 0 | 0 | 0 | 0 | 0 |
| | Channel 149 | 16 Us | 0 | 0 | 0 | 0 | 0 | 0 | 0 | 0 | 0 | 0 | 0 | 0 | 0 | 0 | 0 | 0 |
| | Channel x | 16 Us | 1 | 1 | 1 | 1 | 1 | 1 | 0 | 0 | 0 | 0 | 0 | 0 | 0 | 0 | 0 | 0 |
| | Channel y | 16 Us | 0 | 0 | 0 | 0 | 0 | 0 | 0 | 0 | 1 | 1 | 1 | 1 | 1 | 1 | 0 | 0 |
| WLAN nfrastrucure Attribute | — | 32 Us | 1 | | 1 | | 1 | | 0 | | 0 | | 0 | | 0 | | 0 | |
| P2P Operation Attribute | — | 32 Us | 0 | | 0 | | 0 | | 0 | | 1 | | 1 | | 1 | | 0 | |
| Further NAN Service Discovery Attribute | — | 64 Us | 1 | | | | 0 | | | | 1 | | | | 0 | | | |

In particular, it is unable to know a method of obtaining information for making the NAN device use multiple channels to transmit data in a data path via the Table 4. And, it is also unable to know a procedure of using multiple channels to make the NAN devices transmit data in a data path via the Table 4.

Hence, in the following, when the NAN devices transmit data via a data path, a method of obtaining information on multiple channels used by the NAN devices to transmit data and a procedure therefor are explained.

For example, although the NAN devices are able to obtain information on multiple channels based on Table 4, the NAN devices are unable to know whether or not the multiple channels are used (busy/clear). In particular, although the NAN devices obtain information on the multiple channels to be used by the NAN devices and intend to use a corresponding channel to transmit data, if the channel is already used by a different application service, the NAN devices are unable to use the multiple channels.

discovery attribute. In particular, the NAN devices can transmit the service discovery frame within or at the outside of the discovery window period, by which the present invention may be non-limited.

In this case, the NAN devices can exchange the service discovery frame including the multichannel information via a common channel. In this case, for example, in case of 2.4 GHz frequency band, the common channel may correspond to channel 6. For example, the NAN devices can exchange the service discovery frame via a common channel and the exchange of the service discovery frame may correspond to a mandatory procedure.

And, for example, the service discovery frame can include a NAN data path attribute field to share the multichannel information. In this case, for example, the NAN data path attribute field may correspond to a field newly added in Table 3. And, for example, the NAN data path attribute field can be additionally defined as a NAN attribute field shown in Table 3. In particular, the service discovery frame can include the NAN data path attribute field, by which the present invention may be non-limited.

In this case, for example, the NAN data path attribute field mainly includes a multichannel field for data transmission. Yet, the NAN data path attribute field can additionally include other information in consideration of an additional data path.

In this case, for example, Table 5 in the following shows an example of fields included in the NAN data path attribute field. In particular, the NAN data path attribute field can include at least one selected from the fields shown in Table 5. And, the NAN data path attribute field may include an additional field, by which the present invention may be non-limited.

TABLE 5

| Field | Size (octets) | Value | Description |
|---|---|---|---|
| Attribute ID | 1 | 0x0A | Identifies the type of NAN attribute. |
| Length | 2 | Variable | Length of the following fields in the attribute. |
| Multichannel Switch Mode | 1 | Variable | Field for indicating switch and use of multichannel for data transmission |
| Multichannel Switch Count | 2 | Variable | In order to switch to multichannel for data transmission, each device should switch to multichannel within multichannel switch count. |
| Operating Class | 1 | Variable | Field indicating currently used frequency band |
| Current Channel Number | 1 | Variable | Field indicating currently used channel number |
| Number of Channels | 1 | Variable | Field indicating number of channels usable in currently used frequency band |
| New Multichannel Number | 1 | Variable | Field indicating number of new multichannel to be used for data transmission |
| Multichannel Offset | 1 | Variable | Offset field indicating start point when multichannel is used for data transmission |
| Multichannel Randomization Interval | 2 | Variable | Since it is unable to know whether multichannel is busy or idle, wait for duration such as multichannel randomization interval similar to backoff. |
| Short Clear Check Interval | 2 | Variable | If multichannel is determined as idle during multichannel randomization interval, device can start data transmission after waiting for a period as much as mutually known multichannel clear check interval. In this case, the multichannel clear check interval is shorter than multichannel randomization interval and corresponds to duration known to two devices. |

In this case, for example, the NAN data attribute field can include at least one selected from the group consisting of a multichannel switch mode field, a multichannel switch count field, an operating class field, a current channel number field, a number of channels field, a new multichannel number field, a multichannel offset field, a multichannel randomization interval field, and a short clear check interval field.

In this case, for example, the channel switch mode field may correspond to a field informed by NAN devices using a multichannel by switching to the multichannel for data transmission. In particular, the multichannel switch mode field may correspond to a field for indicating whether or not the NAN devices switch to a multichannel from a common channel.

And, for example, when the NAN devices switch to the multichannel for data transmission, the NAN devices should switch to the multichannel within a multichannel switch count. In particular, the multichannel switch count field may correspond to information on a time period for switching to the multichannel. In this case, for example, referring to FIG. 12, a switch count value may correspond to a period (first period) ranging from timing at which the NAN devices exchange the service discovery frame to multichannel offset timing. In particular, the NAN devices should switch to a multichannel to be used by the NAN devices within the first period. In this case, for example, if the NAN devices fail to switch to the multichannel to be used by the NAN devices within the first period, the NAN devices may not perform data transmission. Subsequently, the NAN devices receive a service discovery frame in a next discovery window and may be able to determine whether to switch to a multichannel For example, the operating class field may correspond to a field indicating information on a currently used frequency band. For example, the frequency band may correspond to 2.4 GHz, 5 GHz, or sub 1 GHz, by which the present invention may be non-limited.

And, for example, the current channel number field may correspond to a field indicating a currently used channel number. And, for example, the number of channels field may correspond to a field indicating the number of channels capable of being used in a currently used frequency band.

And, for example, the new multichannel number field may correspond to a field indicating a number of a new multichannel to be used by the NAN devices for data transmission. In this case, for example, when the NAN devices perform data transmission, the NAN devices can perform the data transmission using a channel among available multiple channels. In particular, the NAN devices select a specific channel from among a plurality of channels to perform data transmission.

And, for example, the multichannel offset field may correspond to a field indicating a point at which the NAN devices start to use a multichannel for data transmission. In particular, the NAN devices switch to a specific channel among multiple channels during a multichannel switch count corresponding to a first period and may be then able to use a multichannel based on a multichannel offset field value.

And, for example, the multichannel randomization interval field may correspond to a field for determining whether or not a multichannel selected from multiple channels is available. In this case, for example, the multichannel randomization interval field can be configured by a prescribed period from a start point of using a multichannel In particular, the NAN devices may wait for such a period as a multichannel randomization interval similar to a backoff. In this case, the NAN devices can determine whether or not a multichannel is available (busy/idle). In this case, for example, if a specific channel selected from multiple channels is determined as available, the NAN device can transmit data using the selected specific channel [S1220]. However, if the specific channel selected from the multiple channels is determined as unavailable, the NAN devices may not transmit data. Subsequently, the NAN devices can exchange a new discovery frame in a next discovery window.

And, for example, whether or not a multichannel is available can be determined based on whether or not the multichannel is used by a different service. For example, if a multichannel is used by a different service such as Wi-Fi network in a current frequency band, the multichannel is unavailable (busy). As a different example, if other NAN devices already use a multichannel for data transmission, the multichannel may be in an unavailable state (busy). In particular, whether or not a multichannel is available can be determined based on whether or not the multichannel is used by a different service or other NAN devices. Yet, availability of a multichannel can also be determined by a different criterion, by which the present invention may be non-limited.

And, for example, the short clear check interval field may indicate a period ranging from timing at which a period corresponding to a multichannel randomization interval ends to timing at which data transmission starts. For example, if a specific channel selected from multiple channels is determined as available, the NAN devices can perform data transmission after waiting for the end of a period corresponding to a multichannel randomization interval and then waiting for a period corresponding to a short clear check interval field. By doing so, the NAN devices can exchange data by matching synchronization with each other via the specific channel selected from the multiple channels. In this case, for example, the period corresponding to the short clear check interval field may correspond to a field shorter than a period corresponding to the multichannel randomization interval.

Figure 13:
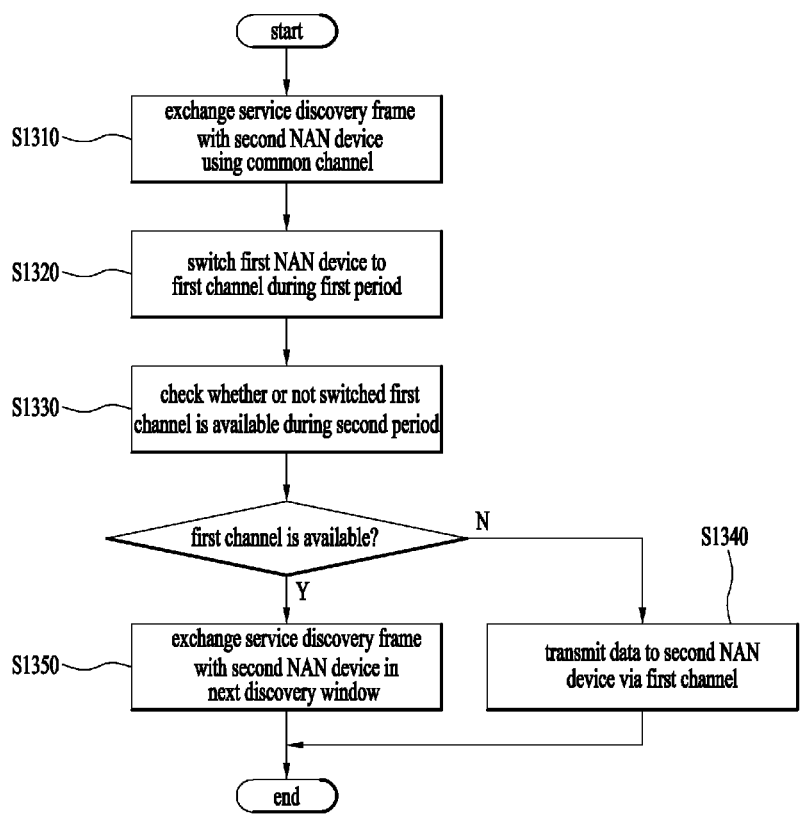
FIG. 13 is a flowchart for a method of transmitting data.

FIG. 13 is a flowchart for a method of transmitting data.

A first NAN device can exchange a service discovery frame with a second NAN device using a common channel [S1310]. In this case, as mentioned earlier in FIGS. 10 to 12, the service discovery frame can be exchanged within or at the outside of a discovery window period. And, for example, a procedure of exchanging the service discovery frame may correspond to a mandatory procedure. And, for example, as mentioned in the foregoing description, the service discovery frame can include a NAN data path attribute field.

Subsequently, the first NAN device can switch to a first channel during a first period [S1320]. In this case, as mentioned earlier in FIGS. 10 to 12, information on the first period can be indicated by the NAN data path attribute field included in the service discovery frame. In this case, for example, a multichannel switch count field of the NAN data attribute field may correspond to a field indicating the information on the first period. In particular, the first NAN device can switch to the first channel during the first period indicated by the channel switch count field. In this case, for example, if the first NAN device fails to switch to the first channel during the first period, the first NAN device does not transmit data and may be able to exchange a service discovery frame in a next discovery window.

Subsequently, the first NAN device can determine whether or not the switched first channel is available during a second period [S1330]. In this case, as mentioned earlier in FIGS. 10 to 12, the second period can be indicated by the NAN data path attribute field included in the service discovery frame. In this case, for example, a multichannel randomization interval field of the NAN data path attribute field can indicate information on the second period. In particular, the first NAN device can determine whether or not the switched first channel is available during the second period based on a multichannel randomization interval field value. And, for example, the first channel may correspond to a channel selected from the multiple channels.

Subsequently, if the first channel is unavailable, the first NAN device can exchange a new service discovery frame with the second NAN device in a next discovery window [S1340]. In this case, as mentioned earlier in FIGS. 10 to 12, if it is determined as a channel selected from multiple channels is unavailable, the first NAN device may not perform data transmission. Subsequently, the first NAN device may wait for a next discovery window. The first NAN device can exchange a new service discovery frame with the second NAN device in the next discovery window.

Subsequently, if the first channel is available, the first NAN device can transmit data to the second NAN device via the first channel [S1350]. In this case, as mentioned earlier in FIGS. 10 to 12, if a third period elapses after the second period ends, the first NAN device can transmit data to the second NAN device. In this case, for example, the second period can be indicated by the multichannel randomization interval field of the NAN data path attribute field. And, the third period can be indicated by the short clear check interval field of the NAN data path attribute field. In particular, if a period for determining whether or not a channel selected from among multiple channels is available elapses and then a prescribed period ends, the first NAN device can transmit data to the second NAN device. By doing so, the first NAN device and the second NAN device can exchange data with each other by matching synchronization with each other.

Figure 14:
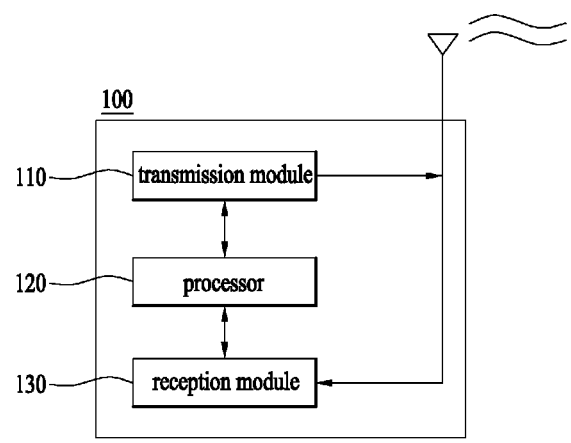
FIG. 14 is a block diagram for a device.

FIG. 14 is a block diagram for a device.

A device may correspond to a NAN device included in a cluster. In this case, as mentioned in the foregoing description, the device can transmit a service discovery frame to a different device in a discovery window to perform service discovery.

In this case, the device 100 can include a transmission module 110 configured to transmit a radio signal, a reception module 130 configured to receive a radio signal, and a processor 120 configured to control the transmission module 110 and the reception module 130. In this case, the device 100 can perform communication with an external device using the transmission module 110 and the reception module 130. In this case, the external device may correspond to a different device. And, the external device may correspond to a base station. In particular, the external device may correspond to a device capable of performing communication with the device 100, by which the present invention may be non-limited. The device 100 can transmit and receive digital data such as contents using the transmission module 110 and the reception module 130. And, the device 100 can exchange a beacon frame, a service discovery frame, and the like using the transmission module 110 and the reception module 130, by which the present invention may be non-limited. In particular, the device 100 performs communication using the transmission module 110 and the reception module 130 and may be able to exchange information with an external device.

According to one embodiment of the present specification, the device 100 can perform data transmission using a multichannel. In this case, the processor 120 can exchange a service discovery frame with a second NAN device using a common channel. In this case, the service discovery frame can include information on the multichannel And, the processor 120 can switch to a first channel during a first period. In this case, information on the first period can also be included in the service discovery frame. And, the processor 120 can determine whether or not the first channel is available during the second period. In this case, information on the second period can also be included in the service discovery frame. If the first channel is available, the processor 120 can transmit data to the second NAN device via the first channel. In this case, as mentioned in the foregoing description, information on the first and the second periods for the first channel can be included in the service discovery frame.

The embodiments of the present invention may be achieved by various means, for example, hardware, firmware, software, or a combination thereof.

In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

And, both an apparatus invention and a method invention are explained in the present specification and the explanation on both of the inventions can be complementally applied, if necessary.

INDUSTRIAL APPLICABILITY

Although the present invention is explained under the assumption that the present invention is applied to a NAN wireless communication system, by which the present invention may be non-limited. The present invention can be applied to various wireless systems using the same scheme.

What is claimed is:

1. A method for transmitting data in a wireless neighbor awareness networking (NAN) communication system, the method comprising:
   exchanging, by a first NAN device, a service discovery frame (SDF) with a second NAN device via a common channel within a discovery window (DW),
   wherein the SDF includes first information related to a first time interval for switching to a data channel for data transmission, second information related to a frequency number of the data channel, third information related to a second time interval for determining that the data channel is available, fourth information related to a third time interval for synchronization of the first NAN device with the second NAN device, and fifth information related to a time point when the first NAN device and the second NAN device start to use the data channel, sixth information related to whether the first NAN device switches to the data channel from the common channel, seventh information related to frequency band in which the first NAN device operates, eighth information related to a number of channels used for the frequency band, and ninth information related to a start point when multichannel is used for data transmission,
   wherein the third time interval is shorter than the second time interval, and the third time interval is known to the first NAN device and the second NAN device, and
   wherein the first NAN device exchanges the SDF with the second NAN device in a next DW based on the first NAN device failing to switch to the data channel within the first time interval;
   switching, by the first NAN device, to the data channel based on the frequency number within the first time interval;
   determining, by the first NAN device, whether the data channel is available during the second time interval, wherein the first time interval is followed by the second time interval;
   based on a determination that the data channel is available during the second time interval, synchronizing, by the first NAN device, with the second NAN device to transmit a data frame to the second NAN device via the data channel during the third time interval; and
   transmitting, by the first NAN device, the data frame to the second NAN device via the data channel based on the fifth information after the third time interval.

2. The method of claim 1, wherein the data channel is a channel selected from multiple channels, available for the first NAN device and the second NAN device to switch.

3. A first neighbor awareness networking (NAN) device transmitting data in a wireless NAN communication system, the first NAN device comprising:
   a receiver;
   a transmitter; and
   a processor, operatively coupled to the receiver and the transmitter,
   wherein the processor is configured to:
   exchange a service discovery frame (SDF) with a second NAN device via a common channel within a discovery window (DW),
   wherein the SDF includes first information related to a first time interval for switching to a data channel for data transmission, second information related to a frequency number of the data channel, third information related to a second time interval for determining that the data channel is available, fourth information related to a third time interval for synchronization the first NAN device with the second NAN device, and fifth information related to a time point when the first NAN device and the second NAN device start to use the data channel, sixth information related to whether the first NAN device switches to the data channel from the common channel, seventh information related to frequency band in which the first NAN device operates, eighth information related to a number of channels used for the frequency band, and ninth information related to a start point when multichannel is used for data transmission,
   wherein the third time interval is shorter than the second time interval, and the third time interval is known to the first NAN device and the second NAN device,
   wherein the first NAN device exchanges the SDF with the second NAN device in a next DW based on the first NAN device failing to switch to the data channel within the first time interval;
   switch to the data channel based on the frequency number within the first time interval;

determine whether the data channel is available during the second time interval, wherein the first time interval is followed by the second time interval;

based on a determination that the data channel is available during the second time interval, synchronize with the second NAN device to transmit a data frame to the second NAN device via the data channel during the third time interval; and transmit the data frame to the second NAN device via the data channel based on the fifth information after the third time interval.

4. The first NAN device of claim 3, wherein the data channel is a channel selected from multiple channels, available for the first NAN device and the second NAN device to switch.

* * * * *